April 29, 1958  W. H. GILLE  2,832,551
AUTOMATIC PILOT FOR AIRCRAFT
Filed Nov. 10, 1952
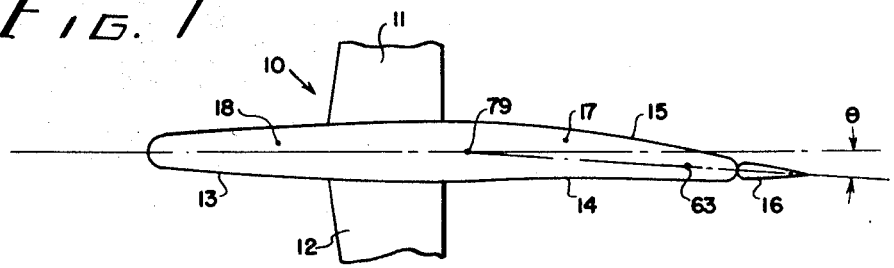
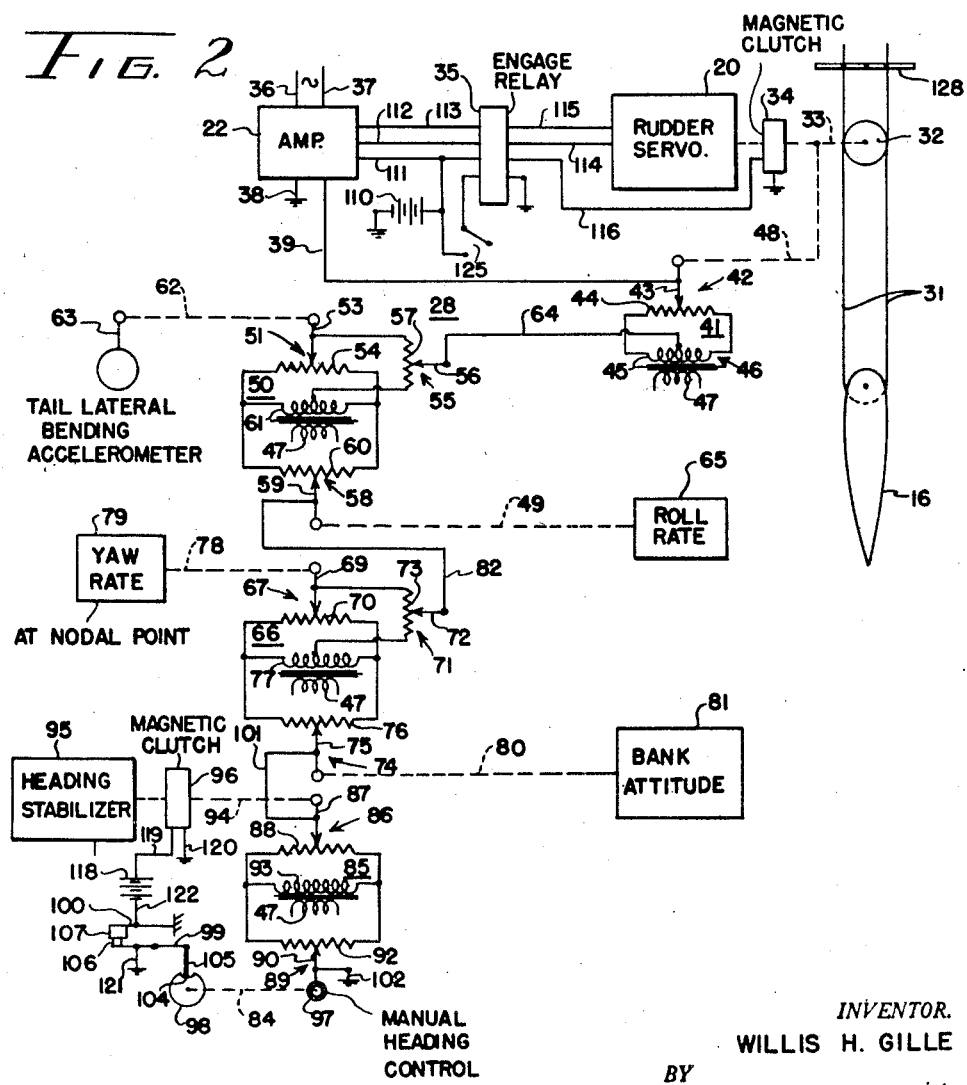
INVENTOR.
WILLIS H. GILLE
BY
George H. Fisher
ATTORNEY United States Patent Office 2,832,551
Patented Apr. 29, 1958

2,832,551

AUTOMATIC PILOT FOR AIRCRAFT

Willis H. Gille, St. Paul, Minn., assignor to Minneapolis-Honeywell Regulator Company, Minneapolis, Minn., a corporation of Delaware Application November 10, 1952, Serial No. 319,716

8 Claims. (Cl. 244—77)

This invention pertains to improvements in flight control systems for dirigible craft, in particular for dirigible craft having aerolastic structural bodies. In such aerolastic dirigible craft for example an airplane with conventionally a fuselage one section thereof deflects with respect to a remaining section upon the application of local exterior forces upon said one section. While such deflections are permitted, this invention is primarily concerned with damping oscillations of the one section relative to the remaining section upon such deflection occurring when relatively different forces are applied to said two sections.

In accordance with this invention, a device is arranged in the tail section of the fuselage of an aircraft for producing a signal in response to the structural deflection of the tail section relative to the forward section of the craft. The signal more specifically is proportional to the acceleration of the deflection, and the signal thus produced is adapted to operate a control surface of the craft. This operation of the control surface dampens the oscillations of the tail section relative to the front section about a steady state relative position of the two sections.

In the drawings where for example, the invention is applied to the rudder or vertical axis of the craft:

Figure 1 illustrates an aerolastic fuselage of an aircraft in a typical instance of structural deflection of the tail section relative to the front section in response to a force on the tail section.

Figure 2 is a schematic arrangement of a control system for operating a rudder control surface of the craft to damp oscillations occurring during such deflection.

Referring to Figure 1, an aircraft 10 has supporting wings 11 and 12 laterally extending from a fuselage 13. The fuselage 13 represents the fuselage of a large aircraft of the type which is subject to aerolastic deformations in flight. The fuselage 13 comprises the tail section 17 and the front section 18. When the rudder control surface 16 is angularly displaced, the aero-dynamic load on the rudder surface applies a torque tending to change the heading of the fuselage 13. The torque on the displaced rudder is resisted by members arranged in the fuselage 13 in order to maintain the rudder in displaced position.

Due to the large inertia of the fuselage 13 opposing its rotation about the vertical axis by the displaced rudder 16 and due to other factors, the effect of the torque on the rudder 16 is to cause the tail section 17 to be deflected from longitudinal alignment with the front section 18. The deflection is manifested by an elongation of the fuselage side 15 and a compression of the fuselage side 14 which ultimately reaches a steady state value. However, when the rudder is displaced initially to apply a sudden torque on the craft about its vertical axis the section 17 deflects with respect to the section 18 an extent greater than the normal steady state value. The excess in deflection is followed by an opposite movement of the tail section or an oscillation tending to decrease the deflection. These oscillations about the steady state deflection value are inherently damped by the structure and continue for a period of time but ultimately die out. While these oscillations can be tolerated, it is desirable that the number of the oscillations as well as the magnitude of the oscillations be further damped in order that steady state conditions of flight be quickly attained on the aircraft.

The arrangement in Figure 2 provides for the modification in the operation of the rudder surface in response to the acceleration of the tail section 17 relative to the front section 18, to damp out the structural oscillations of the section 17 in the fuselage 13. While Figure 2 includes the arrangement for modifying the position of the rudder 16 in response to local gusts on the tail section 17 it also includes control means which initially cause the rudder displacement which also may cause oscillations requiring corrective rudder.

In Figure 2, the rudder surface 16 of the aircraft is operated by cables 31 extending therefrom to a cable drum 32 supported on a drum shaft 33. The drum shaft 33 is connected to an output shaft of a rudder servomotor 20 through a magnetic clutch 34. The rudder servomotor 20 may be a D. C. electric motor having a pair of field windings alternatively energized and each in series with the armature winding for reverse control. The servomotor field windings as well as the clutch winding are operatively connected through a rudder engage relay 35 to a source of D. C. voltage such as a battery 110. While the clutch 34 is directly connected to the battery 110, the servomotor field windings are connected to the battery 110 through a pair of alternatively operated relays of a servomotor amplifier 22. Thus the clutch winding is connected by a conductor 116 to an in contact of the engage relay 35 and the field windings of the servomotor are connected by conductors 114 and 115 to second and third in contacts of the engage relay 35. Extending rightward from the battery 110 is a conductor 111 which connects with the relay arm engaging with the first in contact of the engage relay. The conductor also extends leftward to the amplifier 22 and through the alternatively operated amplifier relays a circuit for each direction of rotation is extended through conductors 112 or 113 through the engage relay to the motor field winding conductors 114 and 115.

The amplifier 22 is of the A. C. discriminator type, and one or the other of its relays is energized depending upon the phase relationship of an A. C. input control signal across amplifier conductors 38 and 39 with respect to the alternating voltage from the supply source across the amplifier power source conductors 36 and 37. The servomotor 20 rotates in one direction or another depending upon the particular amplifier relay energized. This amplifier-servomotor combination is of the type well known in the art and further details thereof are for this reason omitted.

Control signals which are applied across the amplifier signal input conductors 38 and 39 are derived from a balanceable variable impedance network 28. The network 28 comprises: a servo balance network 41, a craft lateral deflection acceleration-craft roll rate network 50, a craft yaw rate-craft bank attitude network 66, and a heading stabilizer-manual heading control network 85. The network 41 comprises a servomotor follow-up potentiometer 42 having a slider 43 and resistor 44. The resistor 44 is connected across a secondary winding 45 of a transformer 46 having a primary winding 47. The amplifier input conductor 39 connects with the slider 43 which is operated by a follow-up drive connection 48 extending from the slider 43 to the drum shaft 33.

Network 50 comprises: an acceleration potentiometer 51 having a slider 53 and resistor 54, a roll rate potentiometer 58 having a slider 59 and resistor 60, a secondary winding 61 of the transformer 46, and a voltage dividing potentiometer 55 having a slider or adjustable tap 56 and resistor 57. The potentiometer resistors 54 and 60 are connected in parallel across the secondary winding 61. Resistor 57 is connected between the slider 53 and a center tap of secondary winding 61. Slider 53 is operated along resistor 54 by means of an operating connection 62 extending therefrom to an accelerometer 63. The accelerometer 63 may be of the pendulum type suitably damped.

This accelerometer is positioned in the tail section of the fuselage of the aircraft in such manner that it is constrained to pivot in a lateral direction about an axis parallel to the craft longitudinal axis in response to side deflections of the fuselage. The slider 53 thus is moved proportional to the acceleration of deflection of the tail section 17 relative to the front section 18. The adjustable tap 56 is positioned along resistor 57 to select any ratio of the signal voltage developed between slider 53 and the center tap of secondary winding 61 due to the movement of slider 53 along resistor 54. A conductor 64 extends from the adjustable tap 56 to a center tap of secondary winding 45 in network 41. Slider 59 is positioned along resistor 60 by means of an operating connection extending from the slider to a roll rate gyroscope 65. The roll rate gyroscope is a conventional two degree of angular freedom gyroscope having a rotor with angular freedom about its spin axis and having a second axis or precession axis at right angles to the spin axis. Restraining means limit the angular precession of the rotor about the second axis in accordance with the rate of roll of the aircraft.

Network 66 comprises: a craft yaw rate potentiometer 67 having a slider 69 and a resistor 70, a voltage dividing potentiometer 71 having a slider 72 and resistor 73, a bank attitude potentiometer 74 having a slider 75 and resistor 76, and a secondary winding 77 of transformer 46. The potentiometer resistors 70 and 76 are connected in parallel across the secondary winding 77. The potentiometer resistor 73 has one end connected to slider 69 and its opposite end connected to a center tap of secondary winding 77. The slider 69 is positioned along resistor 70 from an operating connection 78 extending therefrom to a craft yaw rate gyroscope 79. This gyroscope similar to the roll rate gyroscope 65 is of the type wherein the rotor has two axes of angular freedom, namely a spin axis and a precession axis with the angular rotation of the rotor about the precession axis restrained by spring means or its equivalent so that the displacement of slider 69 relative to resistor 70 is proportional to the rate of change of heading or rate of yaw of the aircraft. The slider 72 may be manually positioned along resistor 73 to select any ratio of the voltage developed across slider 69 and the center tap of secondary winding 77 due to the operation of slider 69. A conductor 82 extends from the adjustable tap 72 to slider 59 of potentiometer 58. Slider 75 is positioned along resistor 76 in either direction from the electrical center thereof, as measured by a null point of the resistor 76 relative to the center tap of secondary winding 77, by an operating connection 80 extending from the slider to a bank attitude device 81. The bank attitude device 81 may be a conventional vertical gyroscope having a rotor with three degrees of angular freedom. The rotor is arranged with its spin axis vertical and in turn has angular freedom about two respectively horizontal axes. The gyroscope is so arranged in the craft that the slider 75 is displaced relative to the resistor 76 in proportion to the bank attitude of the craft with respect to its normal horizontal position.

Network 85 comprises a heading stabilizing potentiometer 86 having a slider 87 and resistor 88, a manually operable turn control potentiometer 89 having a slider 90 and resistor 92, and a secondary winding 93 of the transformer 46. A conductor 101 connects slider 87 with slider 75 of network 66. A conductor 102 extends from slider 90 to ground which is common to the ground of conductor 38 of amplifier 22 whereby to complete the balanceable series signal circuit to the control electrodes of amplifier 22. The slider 87 is adjusted along resistor 88 by means of mechanical elements connected in series to comprise an operating arrangement consisting of slider operating member 94 and magnetic clutch 96 intermediate a heading stabilizer 95 and member 94. The heading stabilizer may be a conventional three degree of angular freedom gyroscope. This gyroscope has a rotor with a horizontal spin axis. The rotor additionally has angular freedom about a second horizontal axis at right angles to the spin axis and angular freedom about a third axis which is vertically arranged and perpendicular to both horizontal axes of freedom. The arrangement is such that with the clutch 96 energized, slider 87 is positioned relative to resistor 88 in accordance with the magnitude of change in heading of the craft from a selected heading.

The clutch 96 may be of the magnetic type which would include a winding that may be energized from a circuit comprising ground conductor 120, the clutch winding, conductor 119, battery 118, conductor 122, switch contacts 107 and 106, and ground conductor 121. The contacts 106 and 107 are operated by a cam member 98 which is displaced by a manually operable turn control 97 which simultaneously operates slider 90 along resistor 92 to set up a turn control signal. The supporting arrangement for the switch contacts consists of a fixed arm 100 supporting contact 107 and a rocker lever 99 supporting contact 106 at one end thereof. The opposite end of lever 99 has a laterally extending cam follower portion 105 engaging a radial detent 104 in the periphery of cam 98. The cam 98 is operatively driven from the manually operable turn control knob 97 by a suitable operating connection 84. Thus when the knob 97 is operated to displace slider 90 from its electrical center of resistor 92 the cam 98 is rotated to angularly displace lever 99 thereby separating contacts 106 and 107 to open the energizing circuit of the magnetic clutch winding thereby operatively separating the heading stabilizer 95 and its slider 87.

Having described the apparatus of Figure 2 in detail, one operation of the apparatus as illustrative of its purpose will be considered. With the craft on a selected heading, at which time the sliders of the control signal producing potentiometers 42, 51, 58, 67, 74, 86 and 89 at their electrical centers on their resistors, the amplifier signal input circuit is in a balanced condition. Switch 125 is closed to operatively connect the servomotor 20 with amplifier 22 for operation thereby and to surface 16 for its operation by the servomotor by energizing relay 35.

Should a gust change the heading of the aircraft from the selected heading, the change is detected by the heading stabilizer 95 which operates the slider 87 along resistor 88 proportional to the change in heading. A control signal voltage will be developed between slider 87 and slider 90 which is applied through network 28 to the amplifier 22 causing the operation of one of the relays thereof. A circuit is thereby completed from the battery 110 and conductor 111 through the operated amplifier relay to one or the other of conductors 112, 113, through the energized engage relay 35 and conductors 114, 115 through one or the other of the servomotor field windings and thence through the armature winding to ground and return to the battery ground.

The rudder servomotor operates and displaces the control rudder 16. The rudder servomotor also balances the input circuit of amplifier 22 by operating the slider 43. Operation of slider 43 developes a voltage between the slider and the center tap of secondary winding 45 which is equal and opposite to the voltage from network 85.

With the rudder control surface 16 displaced, an aerodynamic load is applied to the rudder tending to turn the craft to correct for the deviation in heading. The load on the rudder surface tends to deflect the tail section 17, Figure 1, with respect to the forward section 18. An acceleration is involved in the deflection of the two sections relative to each other. This acceleration is detected by the accelerometer 63 arranged in the tail section 17. The accelerometer 63 in response to the lateral aceleration operates slider 53 relative to its resistor 54. The slider 53 is now moved in such a direction as to produce a voltage in network 50 which opposes the voltage from network 85 when the acceleration of the deflection of section 17 relative to section 18 is in a direction tending to cause deflection overshoot. This opposing signal through the network 28 causes further operation of the amplifier 22 and servomotor 20. However, this operation of the servomotor 20 is in such a direction as to move the rudder surface 16 toward its center position from its original displaced position caused by the heading change signal from network 85 so that the amount of rudder displacement is less than that called for by the heading change.

The accelerometer 63 through its control of the servomotor 20 by means of network 28 understandably does not so modify the position of the rudder 16 that the deflection of section 17 relative to section 18 immediately attains a steady state value. In other words dead beat damping while desired is not usually obtained but the tail overshoots the steady state deflection value. The aerolastic qualities of the fuselage immediately following the first steady state position overshoot tend to decrease the angular deflection between the sections 17 and 18. During such decrease in angular deflection, the accelerometer moves the slider 53 relative to resistor 54 in an opposite direction from the original response of accelerometer 63 along the resistor whereby a control signal is developed which reinforces the control signal from network 85. Thus the accelerometer provides operation of the rudder to oppose the angular departure of the tail section 17 relative to the forward section 18 from a steady state value of angular deflection.

The accelerometer 63 also responds to local gusts on the craft tending to deflect the tail section 17 relative to the front section 18 and deflects operation of the rudder surface in such a direction that the torque or loading on the displaced rudder surface opposes the gust tending to cause the structural deflection.

The rudder servomotor 20 is connected to the servomotor amplifier 22 electrically and to the rudder surface 16 mechanically (by means of the magnetic clutch 34) through the rudder engage relay 35. The energization of this engage relay 35 is controlled from a manually operable switch 125. With the switch 125 in its opened position, the rudder surface 16 may be directly manually operated from the conventional rudder bar 128 of the aircraft. When the rudder bar 128 is manually displaced to change craft heading, the deflected rudder surface 16 will cause a structural deflection betwen the two fuselage sections 17 and 18 which is followed by oscillations of the section 17 relative to section 18. These oscillations of the free airplane eventually die out and a steady state deflection is reached.

With the engage relay 35 energized, by closing of switch 125 to couple the rudder servomotor 20 to the control surface 16 and to amplifier 22, heading changes through the control apparatus are effected by operation of the manually operable control knob 97. Its operation results in unbalance of the input circuit of amplifier 22 resulting in the operation of the rudder 16.

Unless particular care is taken in the location of the yaw rate gyroscope 79, its reaction to the deflection of the section 17 relative to section 18 due to the displacement of rudder 16 has a detrimental effect on the operation of the electrical system of Figure 2. This detrimental effect is such as to cause the oscillations of the tail section to increase or become divergent. The increase in the oscillations is so great as to require the disengagement of the automatic pilot or control system of Figure 2 from the rudder surface. It has been found that by positioning the yaw rate gyroscope 79 at the nodal point of the deflection, where it responds only to the turning of the aircraft in its entirety, that no divergent oscillations are set up. Thus with the yaw rate gyroscope positioned as indicated in Figure 1 the oscillations of the aerolastic aircraft when subject to the control of the arrangement of Figure 1 is substantially the same as the oscillations when the rudder surface 16 is controlled from the manually operable rudder bar 128.

With the inclusion of the laterally responsive accelerometer 63 in the control apparatus and located in the tail section 17 as indicated in Figure 1, the oscillations of the tail section 17 relative to section 18 are positively damped compared to the oscillations when the rudder surface is operated from the rudder bar 128. The relative damping is such that with the accelerometer control the logarithmic decrement or logarithm of the ratio of successive amplitudes of oscillation is .405 whereas the logarithmic decrement for the free aircraft that is when the rudder bar 128 is used to position the rudder 16 is .165. Thus with the accelerometer located as indicated, the damping of the oscillations is approximately three times as good so that the oscillations terminate in about ⅓ of the time.

It will now be apparent that I have provided a novel control system for an aerolastic dirigible craft which responds upon deflection of one section of the craft relative to another to effect operation of a control surface of the craft in such a direction as to damp oscillatory movements of the one section relative to the other when such deflections arise either from prior displacement of the rudder surface whereby aerodynamic load is applied to the surface or when local air gusts on the one section cause its deflection with respect to the other section.

What is claimed is:

1. Control apparatus for the rudder surface of an aircraft having an aerolastic fuselage: comprising, a heading sensing device, a servomotor control means operated by said device, a servomotor connected to said control means and adapted to position the rudder whereby craft heading is stabilized, and an accelerometer also operating said control means and mounted substantially adjacent said rubber so as to be responsive to lateral structural deflections of the tail section of the aerolastic fuselage with respect to the remainder of the fuselage due to operation of the rudder for additionally operating said rudder to damp the oscillations of the tail section with respect to the remainder of the fuselage.

2. Control apparatus for the rudder surface of an aircraft said apparatus comprising: a displaceable control element mounted in the tail portion of the craft and arranged for movement laterally to said craft, said element being displaced in response to lateral accelerations of the tail portion of the craft when the entire craft is accelerated or when the tail portion only is accelerated; a heading stabilizing means for operating the rudder surface of the craft to maintain heading, the reactive loading on the rudder also causing relative lateral structural deflection of the portion of the craft supporting the displaceable element and the remaining portion; and means for controlling further operation of the rudder than that provided by the heading stabilizing means proportional to the extent of movement of the element to damp the structural oscillations of the tail of the craft relative to the remaining portion of the craft.

3. In flight control apparatus for an aircraft having an aerolastic fuselage and rudder control surface, a servomotor operatively connected to the craft rudder surface, heading control means for effecting operation of said servomotor and rudder surface to displace said rudder whereby a torque is applied to said craft tending to change heading and also to cause relative lateral displacement of the tail and forward part of the fuselage, and further means in said tail and remote from the forward part and operated in proportion to the torque applied to the fuselage for additionally operating said control means to damp oscillations of the tail section relative to the forward part of the fuselage.

4. In control apparatus for an aircraft having a control surface for controlling craft attitude about one of its axes, a servomotor operatively connected to position said surface, an attitude responsive means, control means operated by the attitude means and effecting attitude stabilization operation of the servomotor proportional to the attitude change, an accelerometer means constrained to move in a plane parallel to said one axis and mounted in the tail of the craft which deflects with respect to the forward part of the craft upon displacement of said surface while in flight, said accelerometer means operating through said control means to damp oscillations of the tail section about a steady state deflected tail section position.

5. Apparatus for controlling the rudder surface of an aircraft, said apparatus comprising: a servomotor operatively connected to said rudder; a control means connected to said servomotor; an operable heading control member effecting operation of the control means and thus displacement of said rudder proportional to operation of said control member, an accelerometer constrained for movement in a lateral plane and responsive to lateral accelerations arising from the structural deflection of the craft tail section relative to the front section due to the torque of said displaced rudder by being arranged in the tail section and remote from the front section, and means connecting said accelerometer to said control means to modify the rudder position to damp oscillatory movements of the tail section about the steady state deflected position.

6. Apparatus for modifying operation of a rudder surface of a dirigible craft primarily operated to control the change in craft heading, said apparatus comprising: a servomotor for positioning said rudder, control means for reversibly operating said servomotor, an operable heading control member connected to said control means to effect displacement of said rudder proportional to operation of said member, means mounted in close proximity to said rudder and responsive to the structural deflection of the craft due to the torque of the displaced rudder, and connections from said responsive means to said control means to alter the position of said rudder to damp oscillations in said craft about the steady state deflection position.

7. In flight control apparatus for an aircraft having an aerolastic fuselage subject to lateral structural deflections due to aerodynamic forces on a control surface thereof, in combination: an accelerometer constrained to move in a lateral direction in response to the structural deflection, a servomotor to position said control surface, control means connected to the servomotor to effect reversible operation thereof, and connections from said accelerometer to said control means to effect operation of the control surface tending to damp oscillations about the steady state lateral deflection position.

8. In flight control apparatus for an aircraft having an aerolastic fuselage which on the application of exterior forces is subject to deflection of one section relative to another section, in combination: an accelerometer mounted in the deflecting section and constrained to move relative thereto in the path of the deflection in response to the acceleration effect of the exterior forces, a servomotor to position a surface of said craft into the air stream to apply a torque on the craft tending to oppose the exterior force, control means connected to the servomotor to effect reversible operation thereof, means for operating the control means to effect such surface positioning, and connections from said accelerometer to said control means to effect further operation of the rudder proportional to the operation of the accelerometer.

References Cited in the file of this patent

UNITED STATES PATENTS

| | | |
|---|---|---|
| 2,038,603 | Roche | Apr. 28, 1936 |
| 2,238,403 | Soderquist et al. | Apr. 15, 1941 |
| 2,450,907 | Newton et al. | Oct. 12, 1948 |
| 2,553,546 | Brannin | May 22, 1951 |
| 2,595,309 | Slater | May 6, 1952 |
| 2,611,559 | Meredith | Sept. 23, 1952 |
| 2,649,264 | Slater et al. | Aug. 18, 1953 |